(12) United States Patent
Boice

(10) Patent No.: US 6,824,121 B2
(45) Date of Patent: Nov. 30, 2004

(54) WHEEL SECURING DEVICE

(76) Inventor: Arthur D. Boice, 222 Old Kings Hwy., Lake Katrine, NY (US) 12449

( * ) Notice: Subject to any disclaimer, the term of this patent is extended or adjusted under 35 U.S.C. 154(b) by 0 days.

(21) Appl. No.: 10/351,015

(22) Filed: Jan. 25, 2003

(65) Prior Publication Data
US 2004/0144964 A1 Jul. 29, 2004

(51) Int. Cl.$^7$ .................................................. B66F 3/00
(52) U.S. Cl. ..................................... 254/223; 24/69 ST
(58) Field of Search ............................... 254/222, 223, 254/213; 24/69 ST, 68 CD

(56) References Cited

U.S. PATENT DOCUMENTS

| | | | | |
|---|---|---|---|---|
| 2,416,708 A | * | 3/1947 | Moore | 254/223 |
| 2,738,204 A | * | 3/1956 | Ibey | 410/36 |
| 5,156,506 A | * | 10/1992 | Bailey | 410/100 |
| 6,101,927 A | * | 8/2000 | Kurmlavage | 99/343 |
| 6,106,216 A | * | 8/2000 | Hogan | 414/678 |
| 6,481,692 B1 | * | 11/2002 | King | 254/219 |
| 6,641,116 B1 | * | 11/2003 | Huang | 254/218 |

* cited by examiner

*Primary Examiner*—Emmanuel Marcelo

(57) ABSTRACT

A wheel securing device is utilized with a wheel cradle of a automobile dolly for securing an automobile wheel towing an automobile. The wheel securing device includes a frame, a shaft mounted to rotate in the frame. The shaft extends beyond the frame and the shaft has a slot through it within the frame. A ratchet gear is mounted on the shaft outside and adjacent to the frame. A latch is mounted to rotate on the frame to engage the ratchet gear to permit rotation of the ratchet gear and the shaft in only one direction. A web assembly is utilized for mounting on the automobile wheel. The web assembly is connected to the shaft at the slot. A drive pulley is mounted on the shaft and the drive pulley has a nut extending from it on the side of the drive pulley opposite from the side facing the ratchet gear for tightening the web assembly on the automobile wheel. By placing the ratchet gear and latch on the outside of the frame and extending the shaft, the drive wheel can be placed outside the cradle for easy operation.

3 Claims, 4 Drawing Sheets

WHEEL SECURING DEVICE

BACKGROUND OF THE INVENTION

1. Field of the Invention

This invention relates to a securing device for retaining an automobile wheel to a dolly when the automobile is being towed with the front wheels of the automobile raised off the ground by being placed on the dolly.

2. Prior Art and Objects

The wide-spread use of front-wheel drive vehicles is well recognized. The use of a dolly to tow front wheel drive automobiles and other similar vehicles is also well known. Such dollies are trailers having a cradle into which the front wheels of an automobile are placed. Such dollies are towed behind trucks and recreational vehicles. Particularly, with recreational vehicles, it is most usual to tow an automobile on a dolly behind the recreational vehicle.

To secure the wheel into the cradle of the dolly, straps are utilized with a tightening device. Such devices are ratchet tie-downs having a handle resembling a large belt buckle. The degree of force of such a buckle being used as a handle is limited. Of greater significance, the buckle is located between the dolly and the wheel which makes operation difficult and restricts the extent to which the wheel is held down onto the dolly.

A significant advantage of the current invention is a device which can be actuated close to but outside the restriction of the automobile dolly to permit easy unrestricted operation and the application of significant force.

Therefore, it is apparent that a device that would permit conveniently securing with significantly greater force an automobile wheel onto a dolly would be most advantageous. Of greatest significance is to have the drive means extending outside the dolly and having the ratchet control readily available for operation. The force may also be applied to the drive means by both a rod and a commercially available ratchet wrench.

Therefore, it is an object of this invention to provide a device for conveniently and effectively securing an automobile wheel onto a dolly.

It is a further object this invention to provide a device for securing an automobile wheel onto a dolly which provides extensive force positively to secure an automobile wheel onto a dolly and providing means for readily providing such force.

It is still a further object of this invention to provide a device which is highly durable.

It is another object of this invention to provide a device which can be easily installed on a automobile dolly, either at the time of construction of the dolly or after manufacture.

It is still another object of this invention to provide a device for securing an automobile wheel to a dolly which is inexpensive to produce.

These and other objects will be apparent to those skilled in the art when read in conjunction with the annexed description and drawings.

SUMMARY OF THE INVENTION

A wheel securing device is provided for use with a wheel cradle of a automobile dolly for securing an automobile wheel of an automobile being towed on the dolly. Such wheel securing device includes a frame, a shaft mounted to rotate in the frame. The shaft extends beyond the frame and the shaft has a slot through it within the frame. A ratchet gear is mounted on the shaft outside and adjacent to the frame. A latch is mounted to rotate on the frame to engage the ratchet gear to permit rotation of the ratchet gear and the shaft in only one direction. A web assembly is utilized for mounting on the automobile wheel. The web assembly is connected to the shaft at the slot. A drive pulley is mounted on the shaft and the drive pulley has a nut extending from it on the side of the drive pulley opposite from the side facing the ratchet gear for tightening the web assembly on the automobile wheel.

| DESCRIPTION OF THE NUMERALS | |
|---|---|
| NUMERAL | DESCRIPTION |
| 11 | FRAME |
| 13 | FRONT PANEL |
| 15 | TWO SIDE PANELS |
| 17 | OUTSIDE PANEL |
| 19 | RATCHET GEAR |
| 21 | INSIDE PANEL |
| 23 | SHAFT |
| 25 | OPENINGS |
| 29 | BUSHING |
| 31 | HOLE |
| 33 | COTTER PIN |
| 35 | LATCH |
| 37 | PIN |
| 39 | FINGER |
| 41 | DRIVE WHEEL |
| 43 | ROD OPENINGS |
| 45 | ROD |
| 47 | NUT |
| 49 | SLOT |
| 51 | CRADLE |
| 53 | AUTOMOBILE WHEEL |
| 55 | AUTOMOBILE |
| 57 | WEB ASSEMBLY |
| 59 | INNER BELT |
| 61 | WEB |
| 63 | OUTER BELT |
| 65 | CLIP |
| 67 | SIDE STRAPS |
| 69 | INTERCONNECTING STRAPS |

DETAILED DESCRIPTION OF THE PREFERRED EMBODIMENT

Figure 1:
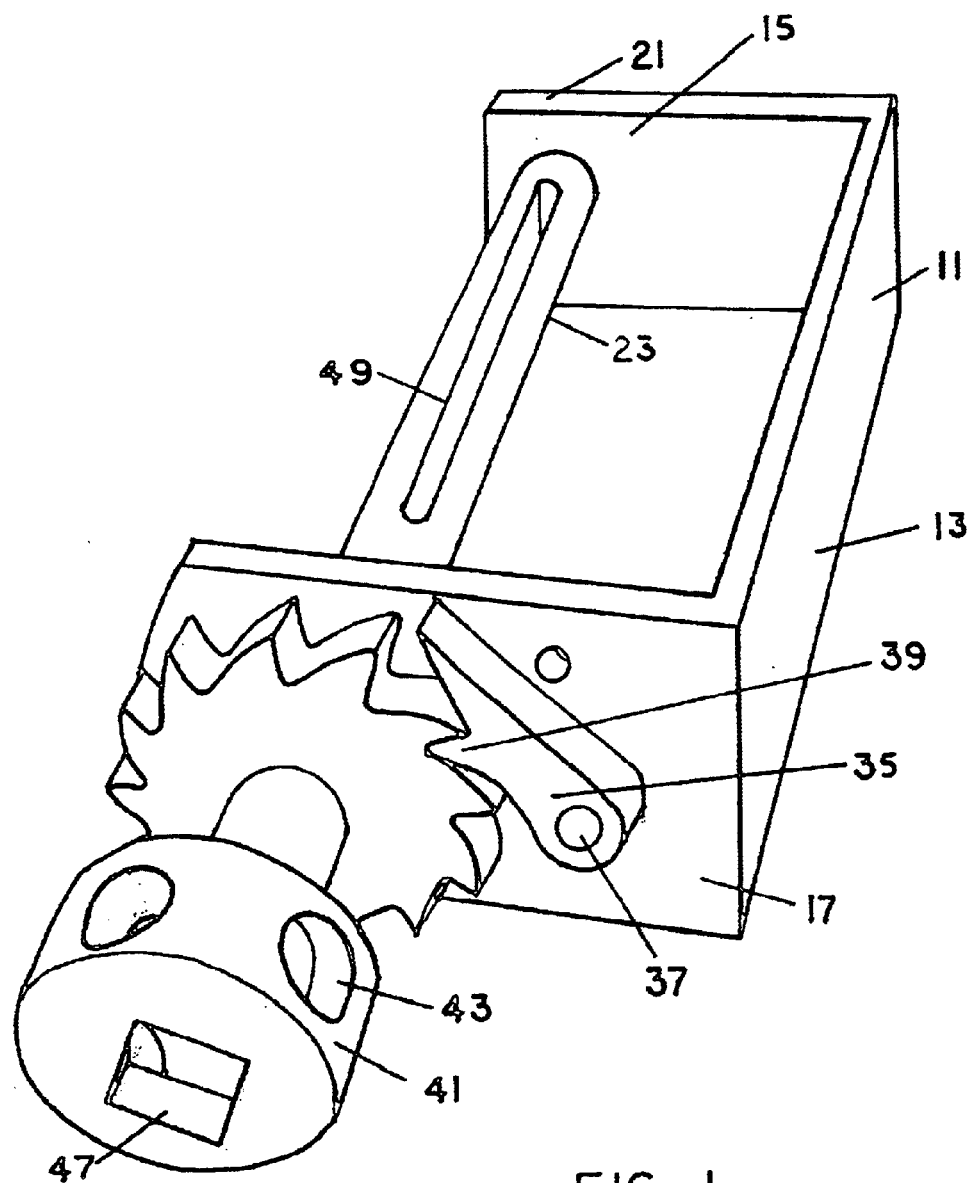
FIG. 1 is a pictorial view of the device showing the frame and the drive wheel as well as the ratchet gear and latch extending from the frame and the ratchet gear and the latch being accessible behind the ratchet drive wheel with the latch engaging the ratchet gear.

Referring now the FIG. 1, the Wheel Securing Device is shown. The Wheel Securing Device is constructed on a frame 11. The frame 11 has a U-shape and includes a front panel 13 and two side panels 15. The two side panels 15 are generally parallel to one another and at right angles to the front panel 13. One side panel 15 is an outside panel 17 which is adjacent a ratchet gear 19 and the other side panel 15 is an inside panel 21.

A shaft 23 is mounted to rotate on the frame 11. Openings 25 are located in both side panels 15 which openings 25 are aligned with one another. The opening 25 in the outside panel 17 is larger than the opening 25 in the inside panel 21.

Figure 2:
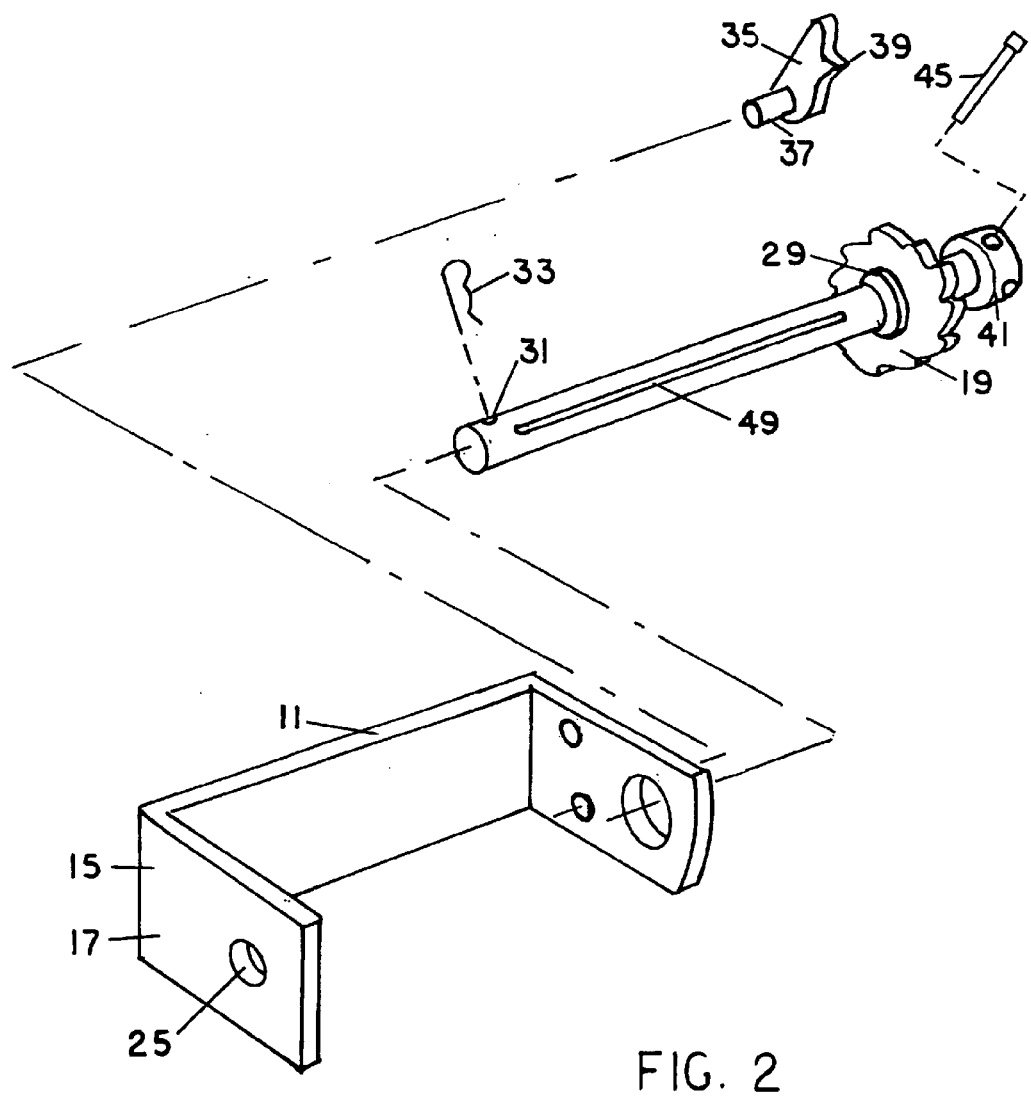
FIG. 2 is an exploded pictorial view from the end of the device opposite from FIG. 1 and showing the shaft with the ratchet gear and drive wheel separated from the frame and also showing the latch separated from the frame.

The shaft 23 extends beyond both side panels 15. Mounted on the shaft 23 adjacent the outside panel 17 is the ratchet gear 19. As best seen in FIG. 2, the ratchet gear 19 has a bushing 29 on one side which bushing 29 fits into the opening in the outside panel 17. The ratchet gear 19 is adjacent the outside panel 17 and also outside the frame 11. The opposite end of the shaft from the ratchet gear 19 is mounted to rotate within the opening 25 in the inside panel 21. The shaft 23 also extends through the inside panel 21. A hole 31 at the end of the shaft 23 which extends outside the frame 11 at the inside panel 21 permits a cotter pin 33 or other suitable fastening device to be inserted through the shaft 23 to prevent the shaft 23 from moving through the inside panel 21. The distance that the shaft 23 extends beyond the outside panel 17 is greater than the distance that the shaft extends beyond the inside panel 21.

Mounted on the outside panel 17 adjacent the ratchet gear 27 is a latch 35. The latch 35 is mounted on the outside panel 17 of the frame 11 on the outside of the frame 11 by means of a pin 37 which permits the latch 35 to rotate to engage the ratchet gear 19. The latch 35 includes a finger 39 which prevents rotation of the ratchet gear 19 in one direction while permitting rotation of the ratchet gear 19 in the opposite direction. Looking at the ratchet gear 19, as shown in FIG. 1, the latch 35 permits rotation of the ratchet gear 19 in a counterclockwise direction.

Figure 3:
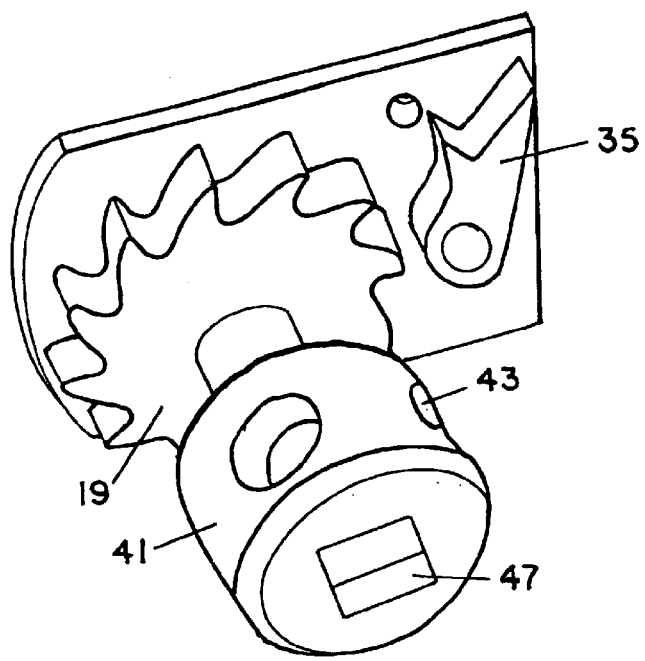
FIG. 3 is a pictorial view similar to a portion of FIG. 1 but with the latch rotated away form the ratchet gear.
Figure 4:
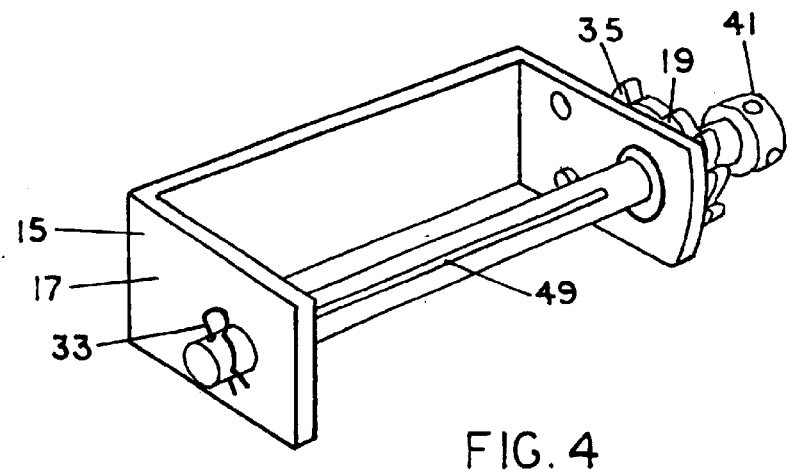
FIG. 4 is a pictorial view of the end of the device opposite from the drive wheel showing the shaft extending through the frame and being held in place by a pin.

In FIG. 1, the latch 35 is shown in its locking position while in FIG. 3, the latch 35 is shown open so that the ratchet gear 19 and thus also the shaft 23 are free to rotate in either direction.

The shaft 23 extends outside the frame 11 beyond the ratchet gear 19. At the end of the shaft 23, beyond the ratchet gear 19 is a drive wheel 41' which is fixedly mounted on the shaft 23. About the circumference of the drive wheel 41 are rod openings 43 which rod openings 43 are generally equally spaced from one another. By placing a rod 45 into a rod opening 43, the drive wheel 41 can be rotated and thus the shaft 23 turned. Mounted on the drive wheel 41 on the side of the drive wheel facing away from the ratchet gear 19 is a nut 47 on a standard socket wrench may be mounted to turn the drive wheel 41 as an alternative to or in combination with the use of the rod 45 in the rod openings 43. The drive wheel 41 is mounted on the shaft 23 further from the inside panel 21 and the outside panel 17 than the ratchet gear 19.

Referring to FIG. 1 and FIG. 2, the shaft 23 is shown with a slot 49 through it. The slot 49 is located within that part of the shaft 23 that is within the frame 11.

Figure 5:
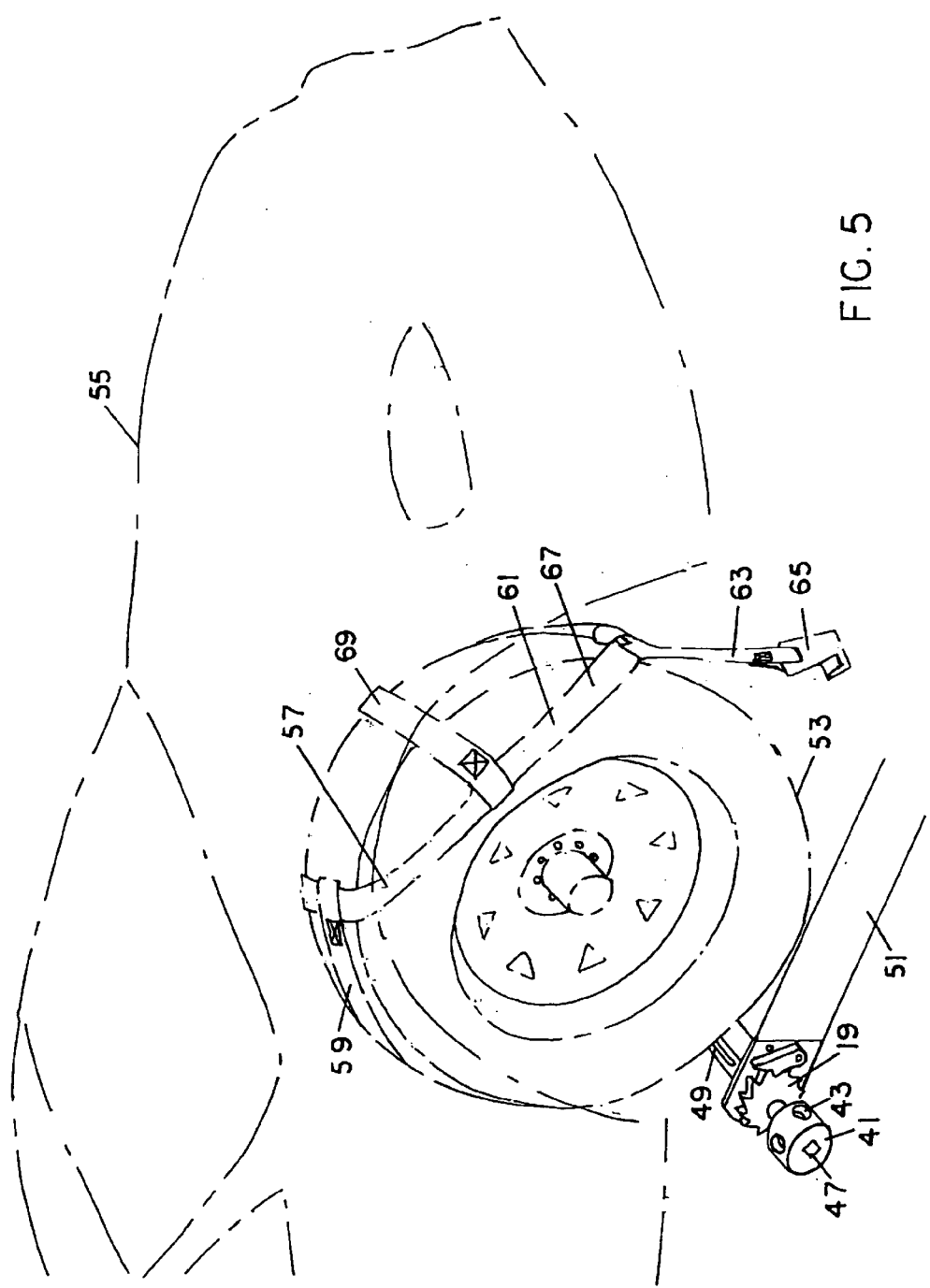
FIG. 5 is a pictorial view showing the device mounted on a automobile dolly with an automobile and one front wheel of the automobile shown in italics with the web assembly over the front wheel.

Referring to FIG. 5, the Wheel Securing Device is shown mounted on the back of a cradle 51 which holds the automobile wheel 53 of an automobile 55. A web assembly 57 which includes an inner belt, a web 61 and an outer belt 63 with a clip 65 is placed over the automobile wheel 53. The inner belt is placed in the slot 49 and is secured to the shaft 23 when the shaft 23 is turned. The inner belt 59 extends along the circumference of the automobile wheel 53 and connects to the web 61 which includes side straps 67 that extend along the side of the wheel 53 with an interconnecting strap 69 between the side straps 67. The outer belt 63 extends from the web 61 to the clip 65 which is secured to the dolly. The web 61 assures that the inner belt 59 and the outer belt 63 stay aligned with the automobile wheel 53 and that the automobile wheel 53 is firmly secured.

By turning the drive wheel 41, the web assembly 57 is tightened. The drive wheel 41 is located outside the cradle 51 to permit access to the drive wheel 41 and readily to permit the web assembly 57 to be tightened down. The force applied to the drive wheel is many times that which can be achieved with an existing ratchet tie down. The convenience of being able to mount the Wheel Securing Device on the automobile dolly with the drive wheel just outside the automobile dolly and with the ratchet gear 19 and the latch 35 conveniently located for easy actuation is apparent and provides a highly superior device over anything now in use. To remove the automobile 55, the latch 35 is rotated away from the ratchet gear 27 which may necessitate first slightly rotating the drive wheel 41' further to tighten the web assembly 57. The shaft 23 then rapidly loosens the web assembly 57 and the clip 65 is removed form the cradle 51.

The device shown in FIGS. 1 through 5 is specifically for use on the right side of the dolly as one faces the rear of the dolly. On the left side, the device would be a mirror image of what is on the right side. Regardless of which side the device is mounted, the operation is described herein remains the same.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A wheel securing device for use with a wheel cradle of a automobile dolly for securing an automobile wheel towing an automobile, such wheel securing device comprising:

a frame, having a front panel and an inside panel and an outside panel; the inside panel and the outside panel being generally parallel to one another and both the inside panel and the outside panel being generally at right angles to the front panel;

a shaft mounted to rotate in the frame and extending beyond the frame, the shaft having a slot through it within the frame;

a ratchet gear mounted on the shaft outside and adjacent to the frame;

a latch mounted to rotate on the frame to engage the ratchet gear to permit rotation of the ratchet gear and the shaft in only one direction;

a web assembly for mounting on the automobile wheel connected to the shaft at the slot for mounting on the automobile wheel; and a drive wheel having a circumference mounted on the shaft having a nut extending from it, the drive wheel having a side facing the ratchet gear and an opposite side and having the nut mounted on the opposite side for tightening the web assembly on the automobile wheel, the drive wheel having openings about the circumference.

2. A wheel securing device according to claim 1 wherein the web assembly includes an inner belt affixed to the shaft, a web and an outer belt with a clip, the web including side straps and on interconnecting strap between the side straps.

3. A wheel securing device for use with a wheel cradle of an automobile dolly for securing an automobile wheel towing an automobile, such wheel securing device comprising:
- a frame having a front panel and an inside panel and an outside panel, the inside panel and the outside panel being generally parallel to one another and both the inside panel and the outside panel being generally at right angles to the front panel, an outside opening being located through the outside panel and an inside opening being located through the inside panel, the inside opening and the outside opening being aligned with one another, the outside opening being larger than the inside opening;
- a shaft mounted to rotate in the inside panel and the outside panel and extending beyond the inside panel; and beyond the outside panel, the distance that the shaft extends beyond the outside panel being greater than the distance that the shaft extends beyond the inside panel, the shaft having within the frame a slot through it;
- means connected to the shaft to prevent the shaft from moving through the inside panel toward the outside panel;
- a ratchet gear mounted on the shaft outside the frame and adjacent the outside panel, the ratchet gear having a bushing affixed to it which fits into the outside opening;
- a latch mounted to rotated on the outside panel to engage the ratchet gear to permit rotation of the ratchet gear in only one direction;
- a web assembly having two ends, one end being connected to the shaft at the slot and the other end having a clip for connection to the automobile dolly; and
- a drive wheel mounted on the shaft further from the inside panel and the outside panel than the ratchet gear, the drive wheel having rod openings about the circumference and having a nut extending from it.

* * * * *